(12) United States Patent
Fregonese et al.

(10) Patent No.: US 11,779,019 B2
(45) Date of Patent: Oct. 10, 2023

(54) COMPOSITION MADE FROM POLYOL(S) AND STEROL(S) FOR USE IN THE AGRICULTURAL FIELD

(71) Applicant: ELICIT PLANT, Lyons (FR)

(72) Inventors: Alexandra Fregonese, Moncaut (FR); Marie Navarro, Marmont Pachas (FR); Alexandre Eveillard, Moirax (FR); Olivier Goulay, Lyons (FR); Marie-Laure Hisette-Jourdainne, Stutzheim-Offenheim (FR); Aymeric Molin, St Sornin (FR)

(73) Assignee: ELICIT PLANT, Lyons (FR)

( * ) Notice: Subject to any disclaimer, the term of this patent is extended or adjusted under 35 U.S.C. 154(b) by 0 days.

(21) Appl. No.: 16/636,346

(22) PCT Filed: Jul. 26, 2018

(86) PCT No.: PCT/FR2018/051931
§ 371 (c)(1),
(2) Date: Feb. 4, 2020

(87) PCT Pub. No.: WO2019/030442
PCT Pub. Date: Feb. 14, 2019

(65) Prior Publication Data
US 2020/0163338 A1     May 28, 2020

(30) Foreign Application Priority Data

Aug. 7, 2017  (FR) ........................ 1757557
Aug. 7, 2017  (FR) ........................ 1757558

(51) Int. Cl.
*A01N 45/00*     (2006.01)
*A01N 43/16*     (2006.01)

(52) U.S. Cl.
CPC .............. *A01N 45/00* (2013.01); *A01N 43/16* (2013.01)

(58) Field of Classification Search
CPC ................................ A01N 45/00; A01N 43/16
See application file for complete search history.

(56) References Cited

U.S. PATENT DOCUMENTS

2016/0295868 A1   10/2016  Jones et al.
2016/0302423 A1*  10/2016  Jones ..................... A01N 25/00
2020/0163335 A1    5/2020  Fregonese et al.
(Continued)

FOREIGN PATENT DOCUMENTS

| CN | 103563929 A | 2/2014 |
| CN | 106 889 068 A | 6/2017 |
| EP | 0 200 371 A1 | 11/1986 |

(Continued)

OTHER PUBLICATIONS

Wu et al, Machine Translation of CN 103563929, 2014, IP.com, 12 pages. (Year: 2014).*

(Continued)

*Primary Examiner* — Trevor Love
(74) *Attorney, Agent, or Firm* — MORRISON & FOERSTER LLP

(57) ABSTRACT

Use of at least one non-ionic surfactant derived from polyols and a sterol for promoting the growth of a plant and the resistance of a plant to an abiotic stress, and stimulating the defence systems of a plant against an abiotic stress.

19 Claims, 3 Drawing Sheets

(56) References Cited

U.S. PATENT DOCUMENTS

2020/0163338 A1     5/2020    Fregonese et al.

FOREIGN PATENT DOCUMENTS

| EP | 0 289 636 A1 | 11/1988 |
|---|---|---|
| EP | 2183959 A1 | 5/2010 |
| FR | 3069756 A1 | 2/2019 |
| FR | 3069757 A1 | 2/2019 |
| JP | S5157556 A | 5/1976 |
| JP | H0789808 A | 4/1995 |
| KR | 20110124174 A | 11/2011 |
| WO | WO 02/17892 A2 | 3/2002 |
| WO | WO-2018229710 A1 | 12/2018 |
| WO | WO-2019030442 A1 | 2/2019 |
| WO | WO-2019030443 A1 | 2/2019 |
| WO | WO-2021214406 A1 | 10/2021 |

OTHER PUBLICATIONS

Steber, "A Role for Brassinosteroids in Germinatoin in *Arabidopsis*," Plant Physiology, vol. 125, No. 2, pp. 763-769, Feb. 1, 2001.

International Search Report dated Oct. 12, 2018, for International Patent Application No. PCT/FR2018/051931.

International Search Report and Written Opinion dated Dec. 14, 2018, of International Patent Application No. PCT/FR2018/051932, 26 pages. English translation.

Kopewicz, (1969). "Influence of steroids on the growth of the dwarf pea," Naturwissenschaften, 56(5):287, 1 page.

European Chemical Agency, (2022). "Plant Sterols, CAS No. 949109-75-5," available online at <https://echa.europa.eu/registration-dossier/-/registered-dossier/14742>, 19 pages.

Fawzia et al., (2016). "B-Sitosterol Ameliorates the Chemical Constituents of Sunflower (*Helianthus Annuus* L.) Plants, Grown Under Saline Condition," IOSR-JPBS, 11(3):36-45.

Griebel et al., (2010). "A role for beta-sitosterol to stigmasterol conversion in plant-pathogen interactions," The Plant Journal, 63:254-263

International Search Report and Written Opinion dated Aug. 30, 2021 for International Patent Application No. PCT/FR2021/050683, 12 pages. English translation.

Vriet et al., (2012). "Boosting Crop Yields with Plant Steroids," The Plant Cell, 24:842-857.

\* cited by examiner

COMPOSITION MADE FROM POLYOL(S) AND STEROL(S) FOR USE IN THE AGRICULTURAL FIELD

This is application is a Section 371 national phase application based on International Application No. PCT/FR2018/051931, filed Jul. 26, 2018, and claims priority to French Patent Application No. 1757557, filed Aug. 7, 2017 and French Patent Application No. 1757558, filed Aug. 7, 2017; the content of each application is incorporated herein by reference.

In the course of their evolution, plants have developed protective mechanical barriers (cuticle, pectocellulosic wall), particularly against pests.

These barriers give them a constitutive resistance, especially against pathogens. When these mechanical barriers are breached, plants have developed active defense mechanisms such as acquired systemic resistance (SAR). The SAR is certainly less intense or active than the application of a phytosanitary product, but it is sustainable: the plant is prepared for a new attack by a pathogen or other aggressor and will be able to respond more quickly.

In other words, plants have intrinsic means to defend themselves.

Strengthening their own defenses in response to a biotic stress rather than directly combating the threat with phytosanitary products is a scientifically and agronomically interesting solution. Defensive means are found as stimulators of the natural defenses of plants (NDP), which are also called elicitors.

Within the meaning of the invention, "biotic stress" refers to stress originating from living organisms such as pathogenic microorganisms, for example fungi, bacteria, viruses, but also nematodes, insects, mites, herbivores, or parasitic plants.

Within the meaning of the invention, "elicitor" refers to a substance that is recognized by plants and activates a signaling cascade that leads the plant to deploy its means of defense. An elicitor is a substance capable, under certain conditions, of stimulating natural defense mechanisms. These natural defenses are directed against bio-threats (diseases, pests).

We also know how to make plants more resistant to abiotic stress by using a biostimulant.

Within the meaning of the invention, "abiotic stress" refers to stress resulting from non-living organisms such as hydric stress, salt stress, flood stress ("flooding"), wind ("pouring"), thermal stress (cold, frost, thermal shock), ultraviolet stress (solar radiation), stress related to nutrient deficiencies, injury stress, oxidative stress, osmotic stress and chemical stress.

In the context of the present invention, the term biostimulant or plant biostimulant is defined by the study commissioned by the Center for Studies and Strategic Foresight of the French Ministry of Agriculture, Agri-Food and Forestry (MAAF) and funded by the MAAF under the Program 215 (Contract No. SSP-0 2013-094, Final Report—December 2014), entitled "Agricultural Stimulant Products for Improving the Biological Functionality of Soils and Plants—Study of Available Knowledge and Policy Recommendations".

A biostimulant is: "A material that contains (a) substance(s) and/or microorganism(s) whose function, when applied to plants or the rhizosphere, is to stimulate natural processes to improve/advance nutrient uptake, nutrient efficiency, tolerance to abiotic stress, and crop quality, regardless of the nutrient content of the biostimulant". (EBIC, 2014).

Examples of biostimulants currently used are microorganisms, plant extracts or synthetic chemical compounds. However, the effectiveness of these biostimulants is not optimal.

At the same time, contemporary agriculture has a growing need to protect its crops and harvests if it wants to maintain its high yields and already low margins in certain productions.

The poor public image of pesticides (as evidenced by the current communication campaign conducted by the French Union of Industries of Plant Protection—UIPP) poses problems. In addition, the effectiveness of phytosanitary products tends to diminish. Indeed, as in the case of antibiotics used in human medicine, resistance makes them less effective or even ineffective. For all these reasons, it is necessary to limit their use as much as possible by optimizing their effects.

The first problem that this invention proposes to solve is therefore developing compositions that contribute to the biostimulation of plants through certain effects.

As a result, the objective is to develop alternative compositions that are capable of promoting the resistance of plants to an abiotic stress more effectively than the compounds of the prior art.

In other words, the objective is to stimulate certain natural processes to improve/advance nutrient absorption, nutrient efficiency, tolerance to abiotic stress, and crops quality with, in the case of nutrients in particular, as a direct or indirect effect, plant growth, and thus yield improvement.

A second problem that the invention proposes to solve is the development of compositions that are capable of stimulating certain natural mechanisms to improve tolerance to biotic stresses.

A third problem that the invention proposes to solve is the development of compositions that make it possible to limit the quantity of phytosanitary products applied while maintaining the same effect as standard doses. In other words, the third objective is to develop a composition that can be used as a supplement to phytosanitary compositions in particular.

This invention responds to all of these technical problems. More specifically, the Applicant found that these objectives were achieved by combining a non-ionic surfactant derived from polyols and a sterol, hereinafter referred to as "the composition or the composition of the invention".

As a first effect contributing to biostimulation, the composition of the invention is used to promote the elongation of the main roots and the multiplication and elongation of the secondary roots, i.e. the growth of the main and secondary roots.

As a second effect contributing to biostimulation, the composition of the invention is used to promote flowering.

As a third effect contributing to biostimulation, the composition of the invention is used to promote the resistance of plants against abiotic stress.

As a product improving resistance to abiotic stress, the composition is used in particular to limit the stomatal water loss, i.e. to enable the plant to better resist a water stress.

As a natural defense mechanism against a biotic stress, the composition of the invention has a particular effect on the activation of the systemic acquired resistance system.

In some cases, and according to the invention, the composition acts not only to stimulate natural defense mechanisms against biotic stresses but also to promote resistance to abiotic stress.

The fact that the composition of the invention is not a product with a specific activity makes it possible to envision a broad-spectrum use on a large number of crops, which may save minor crops for which the number of plant protection products available is almost nil.

Moreover, the Applicant noted that the composition of the invention made it possible to improve the spreading of liquids on the leaf, in particular of an aqueous solution. This phenomenon would result from the reduction of the surface tension of the leave in contact with the composition of the invention. As a result, by improving the spreading of a solution containing a product that is active in contact with the plant, the quantity of product necessary for an equivalent effect is reduced.

This is therefore of particular interest with regard to phytosanitary products.

As a result, and according to another aspect, the invention also relates to the use of the composition as a supplement to a solution containing an active product for the plant.

As active product, in particular nutrients, one or more fertilizers, one or more growth regulators and/or with a biocontrol product may be considered. Biocontrol products are intended to prevent the action of organisms harmful to plants and are selected in particular from fungicides, fungistats, bactericides, bacteriostats, insecticides, acaricides, parasiticides, nematicides, taupicides or repellents for birds or game, one or more substances which aim to destroy or slow the growth of undesirable plants, chosen in particular from herbicides and anti-dicotyledonous herbicides.

The composition of the invention thus constitutes a saving for the farmer who reduces the number of applications (field passages).

Used indirectly, the product does not cause resistance.

Moreover, the optional alternated use, but above all in combination with "classic" plant protection products (biocontrol products) not only makes it possible, as already mentioned, to limit the quantity of product to be applied, but also to avoid or delay the development of resistance to these products and increase their durability.

When the composition of the invention is used in association with a product that is active in contact with the plant as described above, it is used simultaneously or sequentially.

This type of synergy corresponds in all respects to the society's demands for phytosanitary products:
Respect for the environment;
Absence of danger to humans;
Low doses;
Broad spectrum of use;
Multiple crops;
No induced resistance;
Helps to delay the development of resistance to plant protection products;
Decrease in crop inputs;
Improvement of environmental conditions;
Economic interest;
Regulatory interest.

The composition according to the invention can be applied after emergence or before emergence, on the seed, the seedling (juvenile stage before flowering), the plant during flowering (before, during or after pollination), the plant after fertilization, the plant during fruiting, the fruit, flowers, leaves, stems, roots or in the soil, before or after sowing.

The composition may in practice be applied by spraying, watering, addition to a hydroponic growing medium, seed immersion and/or seed coating.

It is possible to treat plants grown in the field or plants grown in greenhouses or plants grown above ground.

According to this invention, the plant is selected from the group comprising Dicotyledons and Monocotyledons, advantageously from the group comprising cereals, plants with roots and tubers, saccharifies, leguminous plants, plants with nuts, oil-bearing or oleaginous plants, plants for vegetable cultivation, fruit trees, aromatic plants and spices, plants for flower cultivation, or plants for industrial cultivation intended for the production of a raw material for processing.

According to another characteristic of the invention, the non-ionic surfactant derived from polyols is selected from the group comprising sugar fatty acid esters, alkyl monoglucosides and alkyl polyglucosides, alkyl monoglucosides and alkyl polyglucoside fatty acid esters, and N-alkyl glucamides.

Advantageously, the non-ionic surfactant derived from polyols is selected from the group comprising sucrose esters, sorbitan esters and glucose esters.

According to a particular embodiment, the non-ionic surfactant derived from polyols is ethoxylated or non-ethoxylated.

Advantageously, the non-ionic surfactant derived from polyols is sucrose stearate.

According to another characteristic of this invention, the sterol is selected from cholesterol, plant sterols such as campesterol, beta-sitosterol, stigmasterol, brassicasterol, campestanol, sitostanol, animal sterols such as lanosterol or sterols from yeast or fungi such as ergosterol.

Advantageously, the sterol is beta-sitosterol.

According to a particular embodiment, the non-ionic surfactant derived from polyols and the sterol are in solution, advantageously in the form of an aqueous solution, comprising 0.01% to 80%, preferably 0.05% to 30%, even more preferably 0.75% to 3% by weight of the solution of non-ionic surfactant derived from polyols and sterol.

Advantageously, the use according to the invention of at least one non-ionic surfactant derived from polyols corresponding to sucrose stearate and the sterol corresponding to beta-sitosterol.

According to another aspect, this invention relates to a composition comprising sucrose stearate and beta-sitosterol.

Advantageously, the beta-sitosterol is between 1 and 99% by weight of the composition and sucrose stearate is between 99 and 1% by weight of the composition, preferably beta-sitosterol is between 40 and 1% and sucrose stearate is between 60 and 99% by weight of the composition.

The embodiments of the invention and the advantages derived thereof are best shown by the following indicative and non-limiting implementation examples, in support of the appended Figures.

Figure 5:
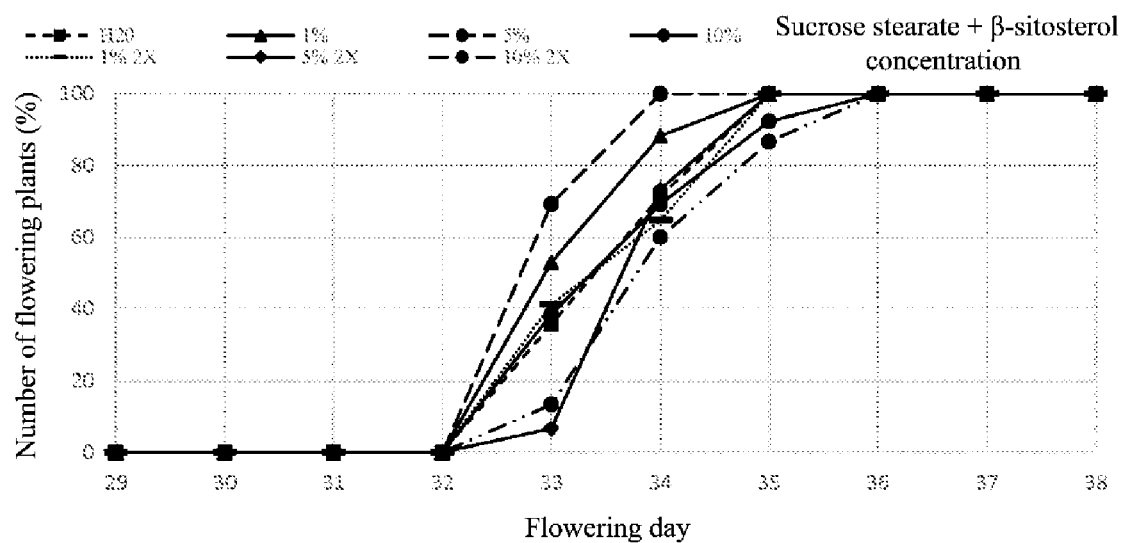

FIG. 5 shows the flowering time for *Arabidopsis thaliana* plants treated with solutions comprising 1, 3 and 10% of the sucrose stearate and beta-sitosterol mixture or a control solution (water; H2O) sprayed once (1%, 3% and 10%) or twice at two-day intervals (1% 2×, 3% 2× and 10% 2×).

Figure 6:
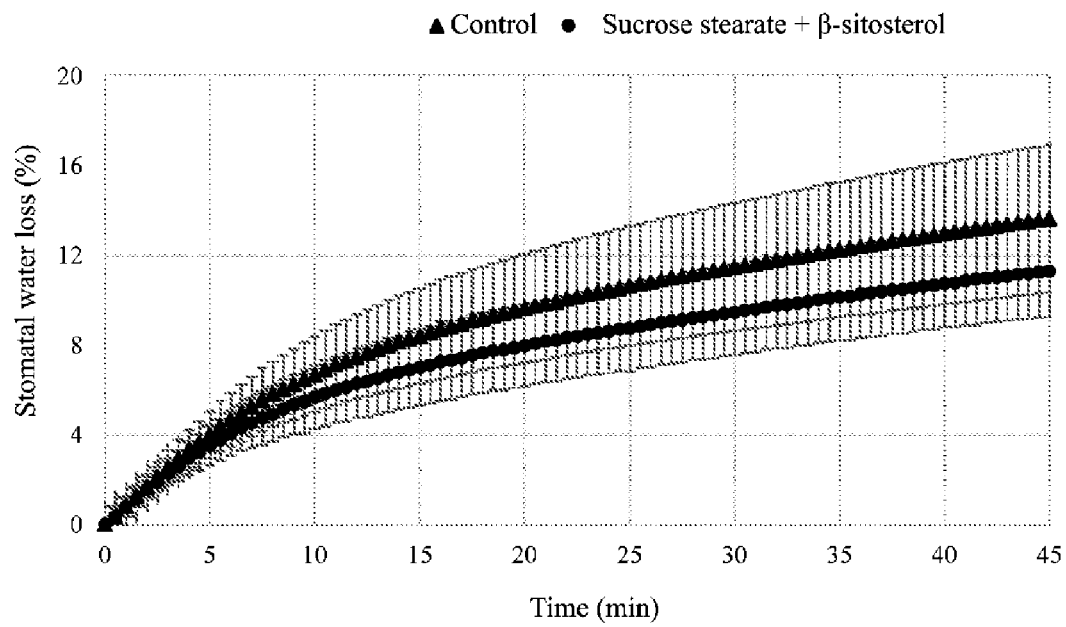

FIG. 6 shows the evolution of the stomatal water loss as a function of time of *Arabidopsis thaliana* plants treated with water or a solution comprising the mixture of sucrose stearate and beta-sitosterol according to this invention.

EXAMPLE 1: PREPARATION OF COMBINATIONS OF A NON-IONIC SURFACTANT AND A STEROL ACCORDING TO THIS INVENTION AND EVALUATION OF THEIR EFFECT ON THE RESISTANCE OF PARSLEY (*PETROSELINUM CRISPUM*) TO AN ABIOTIC STRESS

Different combinations of this invention with a plant sterol are prepared from sucrose stearate and beta-sitosterol.

The combinations are prepared by dry mixing sucrose stearate and beta-sitosterol, in proportions ranging from 0 to 100% by weight with respect to the total weight of the mixture, for each of these ingredients, as shown in the following Table 1.

TABLE 1

| Sample | Sucrose stearate | Beta-sitosterol |
|---|---|---|
| A | 0 | 100 |
| B | 1 | 99 |
| C | 2.5 | 97.5 |
| D | 5 | 95 |
| E | 10 | 90 |
| F | 15 | 85 |
| G | 20 | 80 |
| H | 25 | 75 |
| I | 30 | 70 |
| J | 35 | 65 |
| K | 40 | 60 |
| L | 45 | 55 |
| M | 50 | 50 |
| N | 55 | 45 |
| O | 60 | 40 |
| P | 65 | 35 |
| Q | 70 | 30 |
| R | 75 | 25 |
| S | 80 | 20 |
| T | 85 | 15 |
| U | 90 | 10 |
| V | 95 | 5 |
| W | 97.5 | 2.5 |
| X | 99 | 1 |
| Y | 100 | 0 |

The effectiveness of each combination on the plants tolerance to abiotic stress is analyzed.

Potted parsley plants are grown in a climatic chamber under the following conditions: 23° C. and a photoperiod of 16 h/8 h. Before the treatment all the leaves of the parsley plants are cut off. The treatment of the parsley plants consists of watering the pots every three days with:
- 40 ml of water (Control batch)
- 40 ml of a solution composed of a sample according to Table 1 (97% water+3% of the sample)

This abundant watering is intended to mimic a flooding stress.

Each batch consists of four pots.

After 18 days the plants are observed, and pictures are taken.

All the samples, except the beta sitosterol alone (sample A), show a positive effect on the plants' tolerance to stress.

The results show that sample S produces the optimal effect of plant resistance to abiotic stress (sample S composed of 80% sucrose stearate and 20% beta-sitosterol).

An erecting habit was observed in treated plants, while the control plants had a drooping habit. In addition, the leaves of treated plants are darker in color.

Figure 1:
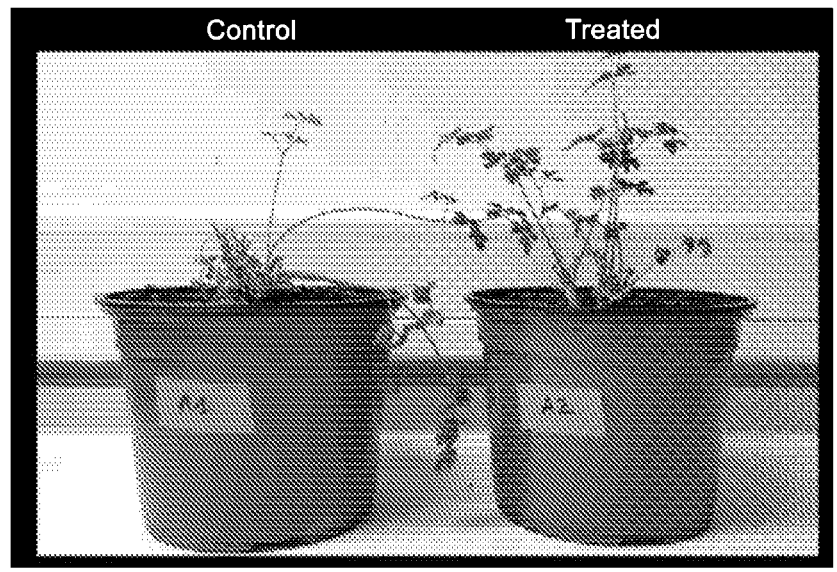
FIG. 1 shows the comparison of the size of parsley plants after watering with water or after watering with a solution comprising the combination of sucrose stearate and beta-sitosterol according to this invention.

The results are shown in FIG. 1.

The application of this invention by watering allows a better tolerance to "flooding" stress.

EXAMPLE 2: EVALUATION OF THE EFFECT OF A NON-ANIONIC SURFACTANT AND A STEROL ACCORDING TO THIS INVENTION ON THE SALICYLIC ACID SYNTHESIS OF PARSLEY

Salicylic acid is a phenolic compound that is involved in the development of both local and systemic resistance (SAR) in plants.

Potted parsley plants are grown under the conditions according to the example 1.

The solutions are applied by watering the base of the plant (40 ml) and spraying the leaves. The solutions tested are:
- Control batch: water;
- treated batch A: solution comprising 97% water and 3% of sample A, i.e. 0% sucrose stearate and 100% beta-sitosterol;
- treated batch B: solution comprising 97% water and 3% of sample Y, 100% sucrose stearate and 0% beta-sitosterol;
- treated batch C: solution comprising 97% water and 3% of sample S, i.e. 80% sucrose stearate and 20% beta-sitosterol.

Each batch consists of four pots.

The plants harvested after the application of the treatment were frozen and crushed with liquid nitrogen in order to carry out a quantitative analysis of the salicylic acid content of the plants.

Figure 2:
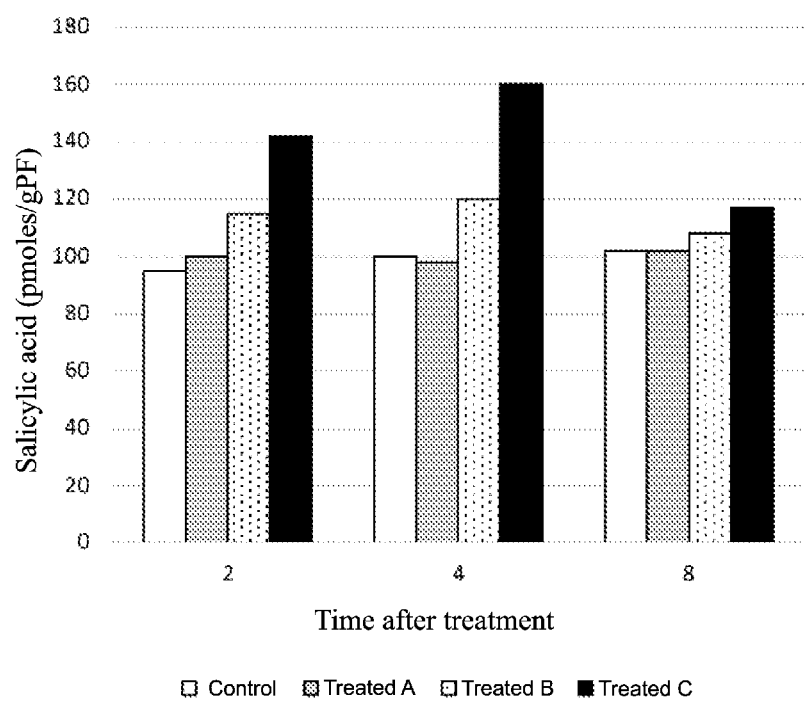
FIG. 2 shows the quantification of salicylic acid in parsley plants 2, 4 or 8 hours after watering with water or a solution comprising the combination of sucrose stearate and beta-sitosterol according to this invention.

The results are shown in FIG. 2.

Unexpectedly, it was observed that the combination of sucrose stearate and beta-sitosterol (sample S) induced a greater stimulation of salicylic acid synthesis than the sum of the effects of each individual compound (sample A: beta-sitosterol+sample Y: sucrose stearate), in response to a biotic stress.

These results therefore demonstrate a synergy of action of these two molecules.

EXAMPLE 3: EVALUATION OF THE EFFECT OF A NON-ANIONIC SURFACTANT AND A STEROL ACCORDING TO THIS INVENTION ON THE ROOT GROWTH OF *ARABIDOPSIS THALIANA*

Plants of *Arabidopsis thaliana* are grown on agar medium in a climatic chamber under the following conditions: 23° C. and a photoperiod of 16 h day/8 h night.

An agar medium is used as control.

Agar media containing $10^{-5}$% and $10^{-3}$% of the mixture of sucrose stearate and beta-sitosterol according to sample S are used to evaluate the effect of this invention on the development of the root system.

The length of the main root and secondary roots is measured between the 2nd and 21st day after germination.

The quantity of secondary roots is assessed visually.

Figure 3:
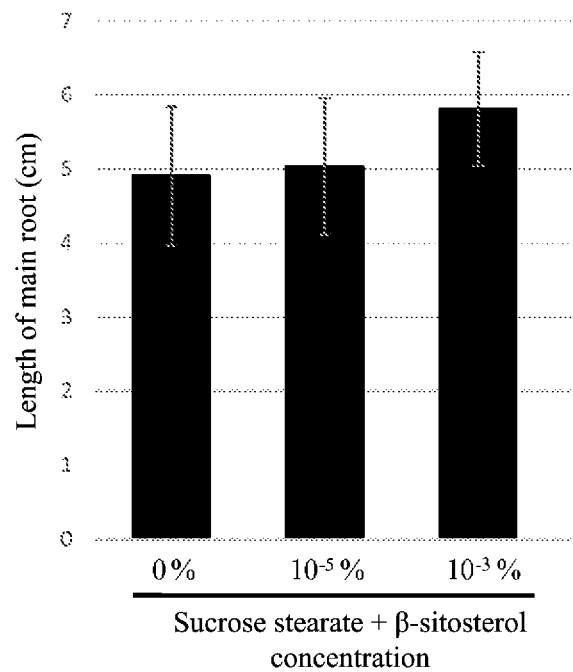
FIG. 3 shows the measurement of the main root length of *Arabidopsis thaliana* plants grown in the absence of sucrose stearate and beta-sitosterol (0%) or in the presence of $10^{-5}$% or $10^{-3}$% sucrose stearate and beta-sitosterol solution.
Figure 4:
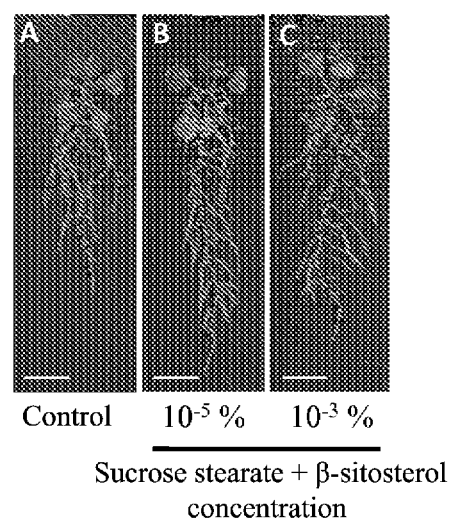
FIG. 4 shows the secondary root system evaluation of *Arabidopsis thaliana* plants grown in the absence of sucrose stearate and beta-sitosterol (0%) or in the presence of $10^{-5}$% or $10^{-3}$% sucrose stearate and beta-sitosterol in solution.

The results are shown in FIGS. 3 and 4.

FIG. 3 shows that the main root of plants grown in the presence of $10^{-5}$% and $10^{-3}$% of the mixture according to this invention is longer than for plants grown in control agar medium.

FIG. 4 shows that plants cultivated in agar media comprising $10^{-5}\%$ and $10^{-3}\%$ of the mixture according to this invention have more secondary roots which also are longer.

It results from this demonstration that the sucrose stearate and beta-sitosterol mixture allows growth of the primary and secondary root system. As a result, the plant is better anchored in the soil and the penetration of nutrients into the plant is more efficient due to a more developed secondary root system.

EXAMPLE 4: EVALUATION OF THE EFFECT OF A NON-ANIONIC SURFACTANT AND A STEROL ACCORDING TO THIS INVENTION ON THE FLOWERING TIME OF *ARABIDOPSIS THALIANA*

Potted plants of *Arabidopsis thaliana* are grown under the conditions of Example 1.

Solutions comprising 1, 3 and 10% of the sucrose stearate and beta-sitosterol mixture according to sample S or a control solution (water; H2O) are sprayed once (1%, 3% and 10%) or twice at two-day intervals (1% 2×, 3% 2× and 10% 2×), on 3-week-old plants.

The number of flowering plants per modality was measured as a function of time.

The results are shown in FIG. 5.

The results show that the solution containing 10% of the mixture according to this invention and sprayed once, as well as the solution comprising 1% of the mixture and sprayed twice, have the same efficacy as water on the flowering of the plants.

On the other hand, a single spraying on the plants of the solutions comprising 1% or 5% of the mixture increases the number of flowering plants compared to the control.

As a result, the sucrose stearate and beta-sitosterol mixture according to this invention accelerates flowering of *Arabidopsis thaliana*.

EXAMPLE 5: EVALUATION OF THE EFFECT OF A NON-ANIONIC SURFACTANT AND A STEROL ACCORDING TO THIS INVENTION ON THE STOMATAL WATER LOSS OF *ARABIDOPSIS THALIANA*

Potted plants of *Arabidopsis thaliana* are grown under the conditions of Example 1.

The 4-week old plants are treated with a foliar spray, 4 hours before measurements are made, with water (Control) or a solution comprising 3% of the mixture of sucrose stearate and beta-sitosterol according to sample S.

The amount of water lost through the stomata over time is measured after detachment of the rosette from the total water mass at t=0, according to the following formula:

$$\text{Loss}(\%) = \frac{(\text{fresh mass } t = 0 - \text{mass } t = T)}{(\text{fresh mass } t = 0 - \text{dry mass})} \times 100$$

The results are shown in FIG. 6.

The data show that the spray application of sucrose stearate and beta-sitosterol according to this invention allows reducing the loss of water through the plant stomata in an effective and sustainable manner over time.

EXAMPLE 7: EVALUATION OF THE WETTING EFFECT OF A NON-ANIONIC SURFACTANT AND A STEROL ACCORDING TO THIS INVENTION ON *ARABIDOPSIS THALIANA*

Potted plants of *Arabidopsis thaliana* are grown under the conditions of Example 1.

The leaves of *Arabidopsis thaliana* are treated with a foliar spray, water (Control) or a solution comprising 3% of the mixture of sucrose stearate and beta-sitosterol according to sample S.

The number of droplets present on the leaf surface of the plant is quantified.

The results show a decrease in the number of droplets on the leaf of *Arabidopsis thaliana* after application of the mixture according to this invention. In other words, the composition of the invention reduces the surface tension of the sprayed solution on the leaves and thus allows a better spreading of the droplets and a better adhesion of the solution on the leaf.

Furthermore, the results show that there is no accumulation of the solution comprising the mixture of sucrose stearate and beta-sitosterol according to this invention at the veins and axillary buds of the plant.

As a result, the mixture of sucrose stearate and beta-sitosterol according to this invention makes it possible in particular to treat grasses known to be poorly wettable.

Another interest is the use of this mixture as a supplement for products that have a contact action.

Moreover, the use of the mixture according to this invention makes it possible to increase the plant's coverage and to use less product per hectare.

The invention claimed is:

1. A method for biostimulating a plant comprising: applying a phytosanitary composition to the plant, wherein the phytosanitary composition is an aqueous solution that comprises sucrose stearate and beta-sitosterol, wherein the sucrose stearate and beta-sitosterol are in a ratio of 80:20 (sucrose stearate:beta-sitosterol).

2. The method according to claim 1, wherein biostimulating is chosen from promoting germination of the plant, promoting elongation of one or more main roots and multiplication and elongation of secondary roots of the plant, promoting flowering of the plant, combating an abiotic stress, combating loss of stomatal water of the plant, stimulating one or more natural defense mechanisms against abiotic stress, and combinations thereof.

3. The method according to claim 2, wherein the one or more natural defense mechanisms is a systemic acquired resistance system.

4. The method according to claim 1, wherein the phytosanitary composition further comprises an active product.

5. The method according to claim 4, wherein the active product is chosen from nutrients, one or more fertilizers, one or more growth regulators and/or with a biocontrol product, one or more substances for destroying undesirable plants or to slow down their growth, and combinations thereof.

6. The method according to claim 5, wherein the biocontrol product is chosen from fungicides, fungistatics, bactericides, bacteriostats, insecticides, acaricides, parasiticides, nematicides, taupicides or repellents for birds or game, and combinations thereof.

7. The method according to claim 5, wherein the one or more substances for destroying undesirable plants or to slow down their growth is chosen from herbicides and anti-dicotyledonous herbicides.

8. The method according to claim 1, wherein the plant is in a stage chosen from after emergence, before emergence, a seed of the plant, a seedling of the plant, during flowering, after fertilization, during fruiting, fruit of the plant, flowers of the plant, leaves of the plant, plant stems, plant roots, soil of the plant before sowing, and soil of the plant after sowing.

9. The method according to claim 1, wherein the plant is chosen from Dicotyledons and Monocotyledons.

10. The method according to claim 1, wherein the plant is chosen from cereals, plants with roots and tubers, saccharifies, legumes, plants with nuts, oil-bearing or oleaginous plants, vegetable plants, fruit trees, aromatic plants and spices, plants for flower cultivation, and plants for industrial cultivation intended for the production of a raw material for processing.

11. The method according to claim 1, wherein the aqueous solution comprises from 0.01% to 80%, from 0.05% to 30%, or from 0.75% to 3% by weight of the sucrose stearate and beta-sitosterol.

12. The method according to claim 1, wherein the phytosanitary composition is applied on the plant by an application chosen from spraying, watering the plant, adding to a hydroponic culture medium, immersing one or more seeds of the plant, and coating one or more seeds of the plant.

13. The method according to claim 1, wherein the phytosanitary composition is applied to the leaves of the plant.

14. The method according to claim 1, wherein the phytosanitary composition does not contain microorganism biostimulant.

15. The method according to claim 1, wherein biostimulating comprises combating an abiotic stress, stimulating one or more natural defense mechanisms against abiotic stress, and combinations thereof.

16. The method according to claim 1, wherein biostimulating comprises stimulating a local resistance system, a systemic acquired resistance system, and combinations thereof.

17. The method according to claim 1, wherein biostimulating comprises promoting elongation of one or more main roots and multiplication and elongation of secondary roots of the plant.

18. The method according to claim 1, wherein biostimulating comprises promoting flowering of the plant.

19. The method according to claim 1, wherein biostimulating comprises combating loss of stomatal water of the plant.

* * * * *